United States Patent [19]

Peddinghaus

[11] Patent Number: 4,573,860

[45] Date of Patent: Mar. 4, 1986

[54] EQUIPMENT FOR DISENTANGLING BARS

[76] Inventor: Rolf Peddinghaus, Deterberger strasse 25, 5828 Ennepetal, Fed. Rep. of Germany

[21] Appl. No.: 607,452

[22] Filed: May 7, 1984

[51] Int. Cl.$^4$ ............................................. B65G 47/12
[52] U.S. Cl. ..................................... 414/745; 198/443; 198/453
[58] Field of Search .................. 193/35, 55; 198/396, 198/443, 453, 445; 414/745, 748; 221/187, 190, 254

[56] References Cited

U.S. PATENT DOCUMENTS 4,362,460 12/1982 Peddinghaus .................. 198/443 X Primary Examiner—Robert J. Spar
Assistant Examiner—Janice Krizek
Attorney, Agent, or Firm—Holman & Stern

[57] ABSTRACT

Equipment for disentangling bars, particularly elongated concrete-reinforcing bars comprising a storage bed consisting of relatively longitudinally spaced frames extending at right angles to the length of the bars each provided with upwardly directed substantially V-shaped mutually aligned cut-outs, vertically liftable supports between said frames also extending at right angles to the length of the bars each having a central portion formed with an upper edge the width of which is less than the maximum width of the V-shaped cut-outs, a vertical slot extending downwardly through the central portion of each liftable support, each slot being provided with vertical guide means for a bulkhead which is vertically displaceable relative to its associated support. In the raised position these bulkheads essentially form the central portions of the supports whereas in the lowered position they lie below the level of a conveyor formed by conveyor rollers mounted in the supports. After initial lifting of the supports some of the bars rest on the central portions thereof and when the bulkheads are lowered those bars drop down the slots onto the conveyor rollers disentangled and prevented from slipping laterally off the supports during conveying by the channel which is delimited by the side walls of the vertical slots.

12 Claims, 1 Drawing Figure

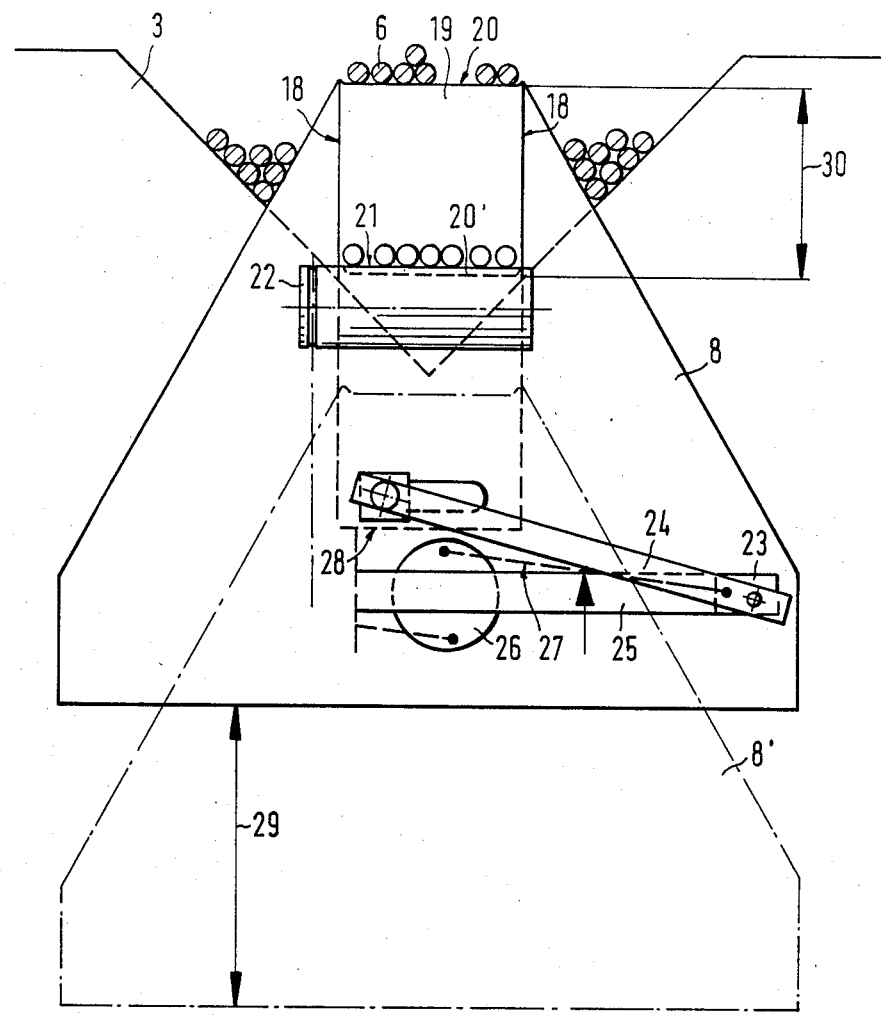

EQUIPMENT FOR DISENTANGLING BARS

BACKGROUND OF THE INVENTION

1. Field of the Invention

The invention relates to equipment for disentangling bars, particularly concrete reinforcing bars, the equipment being of the kind which comprises a plurality of relatively longitudinally spaced frames each extending at right angles to the length of the bars and each having an upwardly directed V-shaped cut-out, the V-shaped cut-outs being mutually aligned, and vertically liftable supports disposed between said frames, each support having a central portion extending vertically relative to the length of the bars and having a width which is less than the maximum width of said V-shaped cut-outs.

2. Description of the Prior Art

With such equipment (such as that described in U.S. Pat. No. 4,362,460), it is possible to solve the problem of disentangling and singling out the bars after they have been deposited on storage beds in such a way that they can be further transported without major difficulty. Thus when the supports, which engage in a comb-like fashion between the frames of the storage beds, are lifted the whole, initially closely piled-up contents of a storage bed, are split up into three parts, namely a first quantity of bars which remains resting on the horizontal upper edges of the central portions of the supports in the lifted or raised state of the latter and the two remaining parts which slide off laterally on both sides during the lifting of the supports. By making a suitable choice in the width of the supports which depend firstly on the number of bars which are to be transported further in a given case, and secondly on the bar dimensions, it is possible to achieve the result that only a comparatively small number of concrete-reinforcing bars will remain on the central portions. Further transport from these central portions may then be obtained by equipping the latter with conveyor rollers.

However, in the course of such further transport, bars which have not been sufficiently well disentangled may still slip off the central portions of the supports and thereby adversely affect also a major portion of bars which as such have already been sufficiently disentangled for further transport. This effect may also cause bending of the bars which make subsequent handling much more difficult.

BRIEF SUMMARY OF THE INVENTION

It is the object of the present invention to achieve a further improvement in the disentangling of the bars as an essential pre-condition for their further transport and processing.

In accordance with the invention, there is provided equipment for disentangling bars, particularly concrete-reinforcing bars, comprising a plurality of relatively longitudinally spaced frames each extending at right angles relative to the length of the bars and each having an upwardly directed V-shaped cut-out, the V-shaped cut-outs being mutually aligned, and vertically liftable supports disposed between said frames, each support having a central portion extending vertically relative to the length of the bars and having a width which is less than the maximum width of said V-shaped cut-outs, characterized in that each of said central portions is formed with a downwardly directed slot and in that a bulkhead is mounted in each slot for vertical movement therein, the bulkhead being guided in its vertical movement by the opposed sides of the associated slot, each bulkhead being movable from an upper position in which its upper edge forms the upper edge of said associated support and a lower position in which the bulkhead upper edge lies below a conveyor element mounted on said associated support.

Thus, when the bulkheads which substantially form said central portion and which support the bars which have already been very largely disentangled are lowered, the bars supported thereon are once more moved about and thereby subjected to a still more effective degree of disentanglement combined with improved alignment in the intended direction of further transport thereof. Since the bulkheads are lowered to a level below the conveying plane of the conveyor rollers or other elements, a conveying trough or channel is created in the dropped state of the bulkheads which channel is laterally delimited by the walls of the slots, whilst the base or bottom of the trough is formed by the conveyor rollers. In particular, the arrangement is such that the bulkheads on the one hand and the conveyor rollers on the other hand are relatively staggered in the direction of the length of the transported bars so that the bulkheads may be moved up and down in the vertical direction between adjacent rollers.

For the better disentanglement of the bars and for their transport it is a special advantage that the individual bars should lie either completely or at least predominantly in just one single layer on the conveyor rollers.

As hereinbefore described, the efficiency of bar-disentanglement and isolation is considerably improved by lowering the bulkheads from their upper position so that the bars will drop down onto the conveyor rollers.

The lifting and lowering of the bulkheads demands a special construction because otherwise, the bulkheads could easily jam and wedge against the vertical walls of the slots in said central portions of the supports. For this reason vertical bulkhead-displacement is produced with the aid of pairs of levers which are symmetrically articulated at their upper ends to slides which are horizontally slidable in slots formed in the vicinity of the bottom bulkhead edges and extend obliquely down from said upper ends. The lower ends of these levers are pivotally connected to further slides which can be driven to and fro in horizontal guideways in the supports. Thus a symmetrical force application to the bulkheads is ensured at relatively spaced juxtaposed points for lifting and lowering the bulkheads. In the course of this operation the oblique levers are pitched more or less steeply without however completely losing their oblique orientation. In order to make absolutely certain of symmetrical force application to the bulkheads for lifting and lowering thereof, the slides for each pair of levers are adapted to be driven by means of a common central drive shaft from which appropriate connecting rods lead to said further slides. With the aid of a suitable motor or with proper transmission gear, it is possible reliably to ensure the common drive shaft setting in the two desired positions which are needed to bring the bulkheads either into their raised, upper positions or their dropped, lower positions.

BRIEF DESCRIPTION OF THE DRAWING

Further description of the invention is provided below with reference to the accompanying drawing which illustrates one example of equipment in accordance with the present invention.

DETAILED DESCRIPTION

The drawing shows an end view of the equipment. The equipment is provided with relatively longitudinally spaced frames one of which is indicated by reference numeral 3, each frame having in its upper edge a substantially V-shaped cut-out. There are also provided supports 8 which are vertically displaceable between the frames 3 in a comb-like fashion by any known means such as is, for example, described in U.S. Pat. No. 4,362,460. In the drawing one support 8 is indicated in its upper position in continuously drawn lines whereas its lowered position is indicated in dot-and-dash lines 8'. The supports 8 therefore have a vertical lift height 29.

In the illustrated upper position of supports 8, the original random pile of bars has already been split up and a middle pile portion including bars 6 has remained resting on the top edges 20 of bulkheads 19 which are vertically displaceable in slots formed in their respective supports and which, in their raised position, form the central portions of said supports. The bulkheads 19 can however be lowered from the raised position, travelling down between the opposed walls of the vertical slots or guides 18. Eventually they occupy the position 20' shown in dotted lines which is at a level below the level of a conveyor 21 which is formed by conveyor rollers 22 mounted on the supports 8 so as respectively to project from one side thereof.

The operations of lifting and lowering each bulkhead 19 relating to its supports 8 is facilitated by a pair of levers, only one of which, for the sake of clearer representation, is here shown and designated by reference 24. This lever is pivotally connected at its upper end to a slide mounted on a slot formed in the vicinity of the bottom edge 28 of the bulkhead 19. A second lever, not shown, is connected to a slide which engages with the bulkhead 19 on the opposite side. The lower ends of the aforesaid levers are pivotally connected to further slides, such as slide 23 which in their turn are adapted to be power-driven in horizontal guideways 25 formed in the supports 8. Their drive is derived from a common shaft 26 connected to the slides 23 of all the supports via traction elements or connecting rods 27. This arrangement guarantees that the forces for the displacement of the bulkheads 19 are symmetrically applied to them so as to avoid any jamming or wedging of the bulkheads 19 in their respective vertical slots or guides 18, the pair of slides 23 associated with the pair of levers connected to each bulkhead being thus adapted to be driven symmetrically towards and away from each other along the associated guideway 25.

Apart from this, as previously mentioned, the supports 8 themselves are also adapted to be lifted and lowered as fully described in U.S. Pat. No. 4,362,460, the distance 29.

The total available vertical lift 30 for the bulkheads relative to their supports is approximately equal to the width of the bulkheads. The observation of this particular dimensional ratio results in a very useful practical improvement in the operating efficiency of the equipment.

I claim:

1. In a device for disentangling elongated bars, including a plurality of relatively longitudinally spaced frames each extending at right angles relative to the length of the bars and each having an upwardly directed V-shaped cut-out, the V-shaped cut-outs being mutually aligned, and vertically liftable supports disposed between said frames, each support having a central portion extending vertically relative to the length of the bars and having a width which is less than the maximum width of said V-shaped cut-outs, the improvement comprising:
   a downwardly extending slot through the central portion of each liftable support formed by downwardly extending opposed side walls and a bottom wall in each support;
   a conveyor element mounted in each support and extending across the respective slot;
   a bulkhead operatively mounted in each slot for vertical movement therein guided by said opposed side walls thereof between an upper position and a lower position;
   a bottom edge on each bulkhead; and
   an upper edge on each bulkhead which in said upper position forms the upper edge of the respective associated support for supporting bars thereon and in said lower position lies below the respective conveyor element, so that said opposed side walls of said slots define the lateral boundaries of a conveyor channel above said conveyor elements when said bulkheads are in said lower position.

2. A device as claimed in claim 1 wherein means is provided for vertically displacing each bulkhead comprising:
   a pair of levers each pivotally connected at one end thereof to a respective bulkhead adjacent said bottom edge thereof and being operable to vertically move said bulkhead.

3. A device as claimed in claim 2 wherein said bulkhead displacing means further comprises:
   a horizontal guideway in each support;
   a pair of slides slidably mounted in said guideway;
   means to pivotally connect the other end of each lever to one of said slides; and
   means to drive said slide of each pair of slides symmetrically towards and away from each other in said guideway.

4. A device as claimed in claim 3 wherein said means to drive said slides comprises:
   a common drive shaft substantially centrally disposed with respect to said supports; and
   connecting rods operatively pivotally connected at their ends to said shaft and said slides, so that rotation of said shaft operates said slides.

5. A device as claimed in claim 1 wherein each bulkhead has a width approximately equal to the height of its vertical displacement.

6. A device as claimed in claim 2 wherein each bulkhead has a width approximately equal to the height of its vertical displacement.

7. A device as claimed in claim 3 wherein each bulkhead has a width approximately equal to the height of its vertical displacement.

8. A device as claimed in claim 4 wherein each bulkhead has a width approximately equal to the height of its vertical displacement.

9. A device as claimed in claim 1 wherein, said conveyor elements comprise rollers.

10. A device as claimed in claim 2 wherein, said conveyor elements comprise rollers.

11. A device as claimed in claim 4 wherein, said conveyor elements comprise rollers.

12. A device as claimed in claim 5 wherein, said conveyor elements comprise rollers.

* * * * *